13. A blade assembly as claimed in claim 1 in which the tangs are formed of an assembly of layers of fibre-reinforced material, the cross-sectional width of said assembly varying radially so as to reduce the formation of stress concentrations.

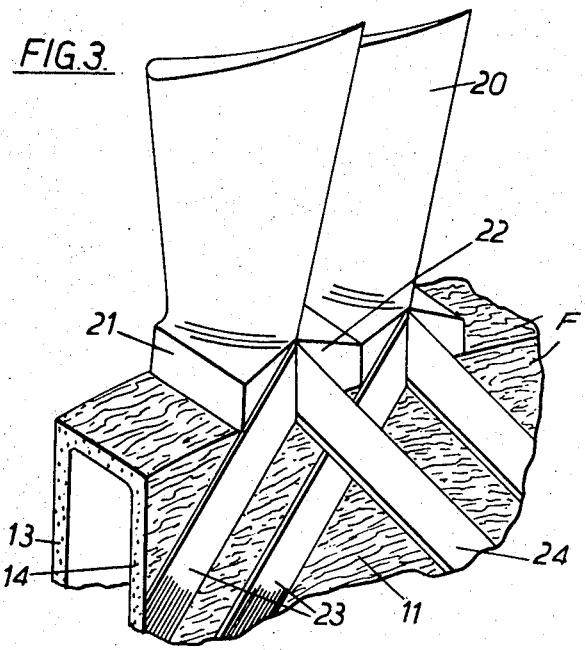

14. A blade assembly as claimed in claim 1 in which the said gaps between the annular portions communicate with cooling passages in the blades, means being provided for passing cooling air through said gaps and into said cooling passages.

15. A blade assembly as claimed in claim 14 in which substantially radially extending vanes are mounted in said gaps, the said vanes, in operation, causing the compression of the cooling air passing through the gaps to be increased.

16. A blade assembly as claimed in claim 1 in which each root portion of each blade has bonded to each of its circumferentially opposite sides a substantially L-shaped fillet member, each fillet member having fibres which have radially extending portions, which are bonded to fibres in the respective root portion, and circumferentially extending portions which are bonded to fibres in the rotatable support member, the fillet members providing the blades with additional resistance to torsional and vibrational stresses.

17. A blade assembly as claimed in claim 16 in which the blade flanks are formed with fibres which extend at an angle to the length of the blade to give increased resistance to torsional stresses.

18. A blade assembly as claimed in claim 16 in which the annular or disc portions comprise a group thereof of which the end members of the group extend radially outwardly of the innner members of the group to define therewith an annular space in which the fillet members are disposed.

19. A blade assembly adapted for use in a fluid flow machine comprising: a fibre-reinforced rotatable support member having a plurality of axially spaced circumferentially continuous portions separated by gaps; a plurality of angularly spaced apart fibre-reinforced blades, each of which has a root portion defined by a plurality of tangs into which fibres of the blades extend, the tangs having slots therebetween, each said tang being mounted and secured in a said gap, fibres of the support member comprising both circumferentially extending fibres, to which are transmitted centrifugal loads from the fibres of the blades, and fibres which extend in the directions of the principal tensile stresses which arise in the rotatable support member from torque loading during rotation.

References Cited
UNITED STATES PATENTS

| | | | |
|---|---|---|---|
| 2,657,008 | 10/1953 | Atkinson. | |
| 2,868,441 | 1/1959 | Reutt | 253—77 XR |
| 3,424,434 | 1/1969 | Palfreyman et al. | 253—77 |
| 3,442,442 | 5/1969 | Seiwert | 253—77 XR |
| 2,857,094 | 10/1958 | Erwin | 230—134 |
| 2,929,755 | 3/1960 | Porter | 264—161 |
| 3,132,841 | 5/1964 | Wilder | 253—77 |
| 3,403,844 | 10/1968 | Stoffer | 230—134 |
| 3,456,917 | 7/1968 | Palfreyman et al. | 253—77 |

EVERETTE A. POWELL, Jr., Primary Examiner

U.S. Cl. X.R.

416—217, 230

| United States Patent Office | 3,532,439 |
|---|---|
| | Patented Oct. 6, 1970 |

3,532,439
FIBROUS REINFORCED BLADED ROTOR
Jack Palfreyman, Tansley, near Matlock, Derby, and Henry Edward Middleton, Derby, England, assignors to Rolls-Royce Limited, Derby, England, a British company
Filed Nov. 24, 1967, Ser. No. 685,434
Claims priority, application Great Britain, Nov. 29, 1966, 53,459/66
Int. Cl. F01d 5/30
U.S. Cl. 416—213          10 Claims

ABSTRACT OF THE DISCLOSURE

A bladed rotor, e.g. of a gas turbine engine compressor, has the root portions of its blades secured to the rotor fibre reinforced synthetic resin tapes which are bonded to the rotor.

---

This invention concerns a bladed rotor e.g. of a gas turbine engine.

According to the present invention, there is provided a bladed rotor comprising a fibre reinforced rotor member having circumferentially extending fibres, at least one row of angularly spaced-apart fibre-reinforced blades which contact the rotor member but are separate therefrom, and fibrous material which secures the root portions of the blades to at least the circumferentially extending fibres of the rotor member, the fibrous material extending over and being bonded to the circumferentially extending fibres of the rotor member, and at least part of the centrifugal loads to which the blades are subjected in operation being transmitted by the fibrous material in shear to the circumferentially extending fibres of the rotor member.

As will be appreciated, the fibrous material may be such as to withstand the centrifugal stresses to which it is subjected, thus securing the blades to the rotor by means of a construction which may be both stronger and lighter than that hitherto used.

The fibrous material is preferably also bonded to the root portions of the blades.

The blades, in addition to being secured to the rotor by the fibrous material, may also be bonded thereto.

The fibrous material may pass over the root portions of the blades so as to bind the root portions to the rotor. Alternatively, the root portion of each blade may have axially opposite end faces to which the fibrous material is bonded, the said centrifugal loads being transmitted from the root portions to the fibrous material in shear.

The fibrous material is preferably constituted by fibre-reinforced synthetic resin tapes. The tapes may be bonded to each other in regions in which they cross over each other.

The blades and the rotor are preferably formed of fibre-reinforced synthetic resin material.

The fibres are preferably carboniferous or boron fibres.

The synthetic resin material may, for example, be an epoxy, polyimide, polyquinoxaline or polythiazole resin.

Alternatively, the fibres of the fibrous material may be coated with a metal or alloy. Thus, the metal may be beryllium, cobalt, chromium, nickel, hafnium, niobium, osmium, palladium, platinum, rhenium, rhodium, tantalum or vanadium, while the said alloy may be a nickel-chromium alloy.

The fibres may be coated by passing them through a bath of the said metal or alloy. Thus the fibres may be coated by being electrolytically plated with the said metal or alloy. Alternatively, the fibres may be coated by spraying or vacuum depositing the metal or alloy.

Carboniferous textile fibres may, for example, be passed through an oven and thence directly to the said bath.

In the case of fibres which have been coated with a metal or alloy, the said bonding may be effected by electrolytic plating, brazing, electron beam welding, or spraying with a metal or alloy.

The invention also comprises a gas turbine engine provided with such a bladed rotor.

The invention is illustrated, merely by way of example, in the accompanying drawings, in which:

FIGS. 1 and 2 are respectively diagrammatic perspective and end views of a bladed rotor in accordance with the present invention, and FIG. 3 is a diagrammatic perspective view of yet another such bladed rotor.

In the embodiment of the present invention shown in FIG. 1, a row of fibre reinforced synthetic resin blades 10 are angularly spaced apart and have been positioned in contact with but are separate from a fibre-reinforced synthetic resin rotor member 11 having fibres F extending circumferentially therein, the blades 10 having root portions 12, which are secured to the rotor member 11, which may be that of a compressor of a gas turbine engine. The rotor member 11 is of hollow construction having side walls 13, 14 and a peripheral wall 15 on which the blades 10 are mounted. The blades 10 are, moreover, preferably hollow to permit a cooling fluid, e.g. air, supplied (by means not shown) to the interior of the rotor member 11 to pass therefrom and flow outwardly through the blades 10 to cool the latter.

The blades 10 are secured to the rotor member 11 by virtue of being bound thereto by fibre reinforced synthetic resin tapes 16 which passes over the root portions 12, the tapes 16 being bonded both to the circumferentially extending fibres F of the rotor member 11 and to the root portions 12 over which they pass, at least part of the centrifugal loads to which the blades 10 are subjected in operation being transmitted by the tapes 16 in shear to the circumferentially extending fibres F of the rotor member 11. If desired, the blades 10 may also be bonded to the rotor member 11.

Alternatively, fibres, e.g. carbon fibres, could be used to bind the root portions 12 to the rotor member 11 and could be subsequently embedded in the synthetic resin material.

The tapes 16 may, but need not, pass completely across the rotor member 11, while part of the centrifugal loads to which the blades are subjected, may be taken directly by the rotor member 11.

The assembly shown in FIG. 1 is finally placed in a mould (not shown) and cured.

As will be seen from FIG. 2, the tapes 16 may pass from the root portion 12 of one blade 10 across a side wall 13 or 14 over the root portion 12 of another blade 10, and so on. Since the tapes 16 are bonded to the fibres F in the side walls 13, 14, at least part of the centrifugal loads to which the blades 10 are subjected will be transmitted in shear to the fibres F in the side walls 13, 14. The rotor member 11 will, of course, be designed to withstand the centrifugal loads transmitted to it. Thus if the loads being transmitted to the rotor member 11 are considerable, the rotor 11 will have to be of appropriately sturdy construction, whereas if only small loads are being so transmitted, the rotor member 11 may be of light construction.

The weave of the fibres in the tapes 16 should be such as to allow maximum contact between the fibres and the fibres F in the side walls 13, 14 for the maximum transmission of their loads. This will avoid stress concentrations. The arrangement of the tapes 16 to ensure that they are adequately bonded to the rotor member 11 will depend upon the number of blades 10 and the thickness and length of the fibres employed. The tapes 16 and the said fibres should be arranged to cross over each other the minimum number of times. Any change in the direction of the fibres produces bending stresses therein, which should be reduced to a minimum.

The passage of individual fibres around the blades could be effected by a thread winder which could be of the automatic indexing type and could wind preselected numbers of fibres or threads between each pair of blades before indexing to the next position.

In the construction shown in FIGS. 1 and 2, there will be some compression of the fibres of the blades at the point where they are contacted by the tapes 16. If it is desired to avoid such fibre compression, the construction illustrated in FIG. 3 may be employed.

In the FIG. 3 construction, the rotor member 11 has the same shape as that of FIG. 1, but blades 20 are employed whose root portions 21 have axially opposite end faces 22 which may be flat, as shown, or curved. Fibre reinforced synthetic resin tapes 23 are bonded to these end faces 22 and are also bonded to the circumferentially extending fibres F in the side walls 13, 14. The tapes 23 cross over each other at regions 24 at which they are bonded to each other. Here again, instead of employing tapes 23, fibres which are subsequently embedded in synethetic resin material may be used. At least part of the centrifugal loads from the blades 20 will be transmitted in shear to the tapes 23, and will then be transmitted in shear from the circumerentially extending fiber F in the tapes 23 to the rotor member 11.

The rotor member 11, of all constructions described, is provided with the circumferentially extending fibres to take the centrifugal loads in shear. The circumferentially extending fibres F may be arranged adjacent the center of the rotor member 11 and the tapes 16 are at least bonded to the fibres in this area and elsewhere. Of course, the circumferentially extending fibres F of the rotor member 11 may be arranged in a plurality of annular regions which are radially spaced from each other with the rotor member being of a light weight construction in areas between the regions, or the circumferentially extending fibres F may be throughout the rotor member 11, as shown in the drawings.

We claim:

1. A bladed rotor assembly comprising: a fibre-reinforced rotor member having circumferentially extending fibres, at least one row of angularly spaced apart fibre-reinforced blades having root portions which contact the rotor member but are separate therefrom, and fibrous material which secures the root portions of the blades to the rotor member, the fibrous material extending over the root portions and being bonded to the circumferentially extending fibres of the rotor member, and at least part of the centrifugal loads to which the blades are subjected in operation being transmitted by the fibrous material in shear to the circumferentially extending fibres of the rotor member.

2. A rotor assembly as claimed in claim 1 in which the fibrous material is also bonded to the root portions of the blades.

3. A rotor assembly as claimed in claim 1 in which the blades, in addition to being secured to the rotor member by the fibrous material, are also bonded thereto.

4. A rotor assembly as claimed in claim 1 in which the fibrous material passes over the root portions of the blades so as to bind the root portions to the rotor member.

5. A rotor assembly as claimed in claim 1 in which the root portion of each blade has axially opposite end faces to which the fibrous material is bonded, the said centrifugal loads being transmitted from the root portions to the fibrous material in shear.

6. A rotor assembly as claimed in claim 1 in which the fibrous material is constituted by fibre-reinforced synthetic resin tapes.

7. A rotor assembly as claimed in claim 6 in which the tapes are bonded to each other in regions in which they cross over each other.

8. A rotor assembly as claimed in claim 1 in which the blades and the rotor member are formed of fibre-reinforced synthetic resin material.

9. A rotor assembly as claimed in claim 1 in which the fibrous material comprises carboniferous or boron fibres.

10. A rotor assembly as claimed in claim 6 in which the synthetic resin is an epoxy, polyimide, polyquinoxaline or polythiazole resin.

References Cited

UNITED STATES PATENTS

| | | | |
|---|---|---|---|
| 3,393,436 | 7/1968 | Blackhurst et al. | 253—77 |
| 2,857,094 | 10/1958 | Erwin | 230—134 |
| 3,216,654 | 11/1965 | Kappus | 253—77 |
| 3,373,928 | 3/1968 | Erwin et al. | 230—116 |
| 3,403,844 | 10/1968 | Stoffer | 253—77 |

EVERETTE A. POWELL Jr., Primary Examiner

U.S. Cl. X.R.

416—230